United States Patent [19]

Yves et al.

[11] Patent Number: 4,910,775
[45] Date of Patent: Mar. 20, 1990

[54] PORTABLE ELECTRONIC DEVICE FOR USE IN CONJUNCTION WITH A SCREEN

[75] Inventors: Audebert Yves, Croissy Sur Seine; Delahye Achille, Fontenay Sous Bois, both of France

[73] Assignee: Telecash, Moulineaux, France

[21] Appl. No.: 217,254

[22] Filed: Jul. 11, 1988

[30] Foreign Application Priority Data

Apr. 21, 1988 [FR] France .................................. 88 05306

[51] Int. Cl.⁴ ............................................. G06F 15/02
[52] U.S. Cl. ........................................ 380/25; 380/24; 235/379; 235/380; 235/382; 340/825.31; 340/825.34
[58] Field of Search .................. 235/379, 380, 382; 340/825.31, 825.34; 380/3, 4, 5, 7, 10, 23-25, 49, 50; 364/200, 900

[56] References Cited

U.S. PATENT DOCUMENTS

| | | | |
|---|---|---|---|
| 3,906,460 | 9/1975 | Halpern | 364/900 |
| 4,211,919 | 7/1980 | Ugon | 380/23 X |
| 4,224,666 | 9/1980 | Giraud | 364/200 |
| 4,450,535 | 5/1984 | DePommery et al. | 364/900 |
| 4,496,158 | 1/1985 | Baer | 273/312 |
| 4,523,087 | 6/1985 | Benton | 235/379 |
| 4,536,647 | 8/1985 | Atalla et al. | 380/24 |
| 4,558,175 | 12/1985 | Genest et al. | 380/21 |
| 4,575,621 | 3/1986 | Dreifus | 380/23 X |
| 4,593,376 | 6/1986 | Volk | 364/900 |
| 4,796,181 | 1/1989 | Wiedemer | 380/4 X |
| 4,799,258 | 1/1989 | Davies | 380/23 X |
| 4,800,590 | 1/1989 | Vaughan | 380/25 |
| 4,829,166 | 5/1989 | Froelich | 235/379 |

FOREIGN PATENT DOCUMENTS

| | | |
|---|---|---|
| 0014654 | 8/1980 | European Pat. Off. |
| 0058029 | 8/1982 | European Pat. Off. |
| 0167044 | 1/1986 | European Pat. Off. |
| 0203683 | 12/1986 | European Pat. Off. |
| 2143636A | 2/1985 | United Kingdom |
| WO 87/01835 | 3/1987 | World Int. Prop. O. |

OTHER PUBLICATIONS

"Microcomputer Security: Data Protection Techniques", 8246 Computers and Security, Dr. Harold Highland, 4(1985) Jun., No. 2, Elmont, N.Y.

"Random Bits & Bytes", 8246 Computers & Security, Dr. Harold Highland, 5(1986) Mar., No. 1, Amsterdam, Netherlands.

"La carte à Mémoire: Choix Technologiques et Caractéristiques", Christian Guion, 8057 Onde Electrique, 64(1984), Jan. Feb., Paris, France.

Primary Examiner—Stephen C. Buczinski
Assistant Examiner—Bernarr Earl Gregory
Attorney, Agent, or Firm—Armstrong, Nikaido, Marmelstein, Kubovcik & Murray

[57] ABSTRACT

The portable electronic device (1) includes some optical reception devices (R), a microcomputer (4) suitable for processing the data received, a display device (6) to display data from the microcomputer (4), and an electrical energy source to supply the various circuits. The device includes a keyboard (8) which enables the user to also to key in data into the microcomputer (4), the latter being programmed to use the data from the optical reception devices (R) and/or from the keyboard (8), and to display results taking account of the data, possibly combined.

15 Claims, 6 Drawing Sheets

PORTABLE ELECTRONIC DEVICE FOR USE IN CONJUNCTION WITH A SCREEN

FIELD OF THE INVENTION

The invention relates to a portable electronic device of the microprocessor-card type, comprising at least some optical reception means, a microcomputer suitable for processing the data received, a display device to display data coming from the computer, and a source of electrical energy to feed the various circuits.

SUMMARY OF THE INVENTION

Such a portable electronic device provides a degree of application which is limited to the control of access to a data processing system. The object of the invention is to provide a portable electronic device such as the one defined hereinabove, which enables the user to perform a maximum number of functions and applications while retaining sufficient reliability of use and effective protection against fraudulent use.

In addition, it is desirable that such a device be small in bulk, have a relatively low cost so that it can be distributed on a large scale, and be simple to operate.

According to the principles of the invention, a portable electronic device which includes at least some optical reception means, a microcomputer suitable for processing the data received, a display unit to display the data emanating from the microcomputer, and a source of electrical energy to feed the various circuits is characterized by the fact that it includes a keyboard enabling the user also to enter data into the microcomputer and that this microcomputer is programmed to use the data from the optical reception means and/or from the keyboard and to display results taking account of these data, possibly in combination.

This combination of devices: optical means for receiving data from outside, a keyboard enabling the user to receive data identified with the user, a display device, a microcomputer, and an electric battery as the energy source, enables the device to function independently. Among other things, it can operate in conjunction with a television set, a data communication terminal, e.g., "MINITEL", or a data processing terminal.

Such a device can be used for making connection between data communication networks, cable networks, and broadcast systems.

The microcomputer can be programmed to make numerous applications possible without altering the existing screens now available, such as remote betting (i.e., betting via "MINITEL", betting and playing games directly on a television set, selection of population samples by television, home shopping, payment for services (pay television with payment by subscription or at the time of consumption), control of access to data processing resources or to an information retrieval service.

When utilization necessitates protection of the device, the microcomputer is programmed to activate this device only after a confidential code identifying the user of the device has been keyed in on the keyboard.

Preferably, the portable electronic device includes a memory for storing data coming from outside.

Advantageously, the display device is of the liquid-crystal type (LCD) and may include eight alphanumeric characters arranged on a straight line.

Preferably, the device is constructed as a box having the shape of a rectangular parallelepiped whose thickness is small, in particular of the order of 5 mm. Preferably, the optical reception means consists of phototransistors; these phototransistors are placed on the edge of a small side of the box. The phototransistors are preferably no more than three in number, all arranged in a straight line.

The phototransistors enables the user to receive optical data from a screen or from active components of the electroluminescent-diode type modulated by an electrical signal.

The three aligned phototransistors enable the user to obtain a flat device that can be pointed at the screen and can be adapted without parametrization to the commonly used sizes of data processing terminals or data communication terminals.

The number of phototransistors may be less than three; two phototransistors can provide the same advantage of adaptation to different screen sizes, but they allow only a smaller amount of data to flow.

An arrangement of four or more phototransistors in a straight line would no longer permit adaptation to different screen sizes without parametrization. Four phototransistors arranged in a square will permit adaptation to all screens, but this would imply that the product would have to be held flat against the screen, making it less ergonomic and poorly suited to small terminals.

Advantageously, the ends of the side of the box holding the phototransistors are fitted with buffers, especially of an elastomer material, of substantially hemispherical shape, enabling the user to better press the box against a convex screen.

Advantageously, the microcomputer can be programmed in such a manner that a timing circuit is provided to cause the electronic device to return to its quiescent state at the end of a predetermined time, e.g., four minutes, after the device has been activated by entering the proper confidential identification code.

In addition, the microcomputer can be programmed such as to disable the device after keying in a certain number of improper confidential codes, e.g., four codes, and such that the product cannot be reactivated unless a special procedure or a special tool is used.

The portable electronic device incorporating the invention can be designed for authorizing connection to an information retrieval service via a terminal or its equivalent; in such a case, the microcomputer is programmed to ensure that, after the identification function has been performed, an authentication function will be carried out at the information retrieval service by calculating, on the basis of data from the information retrieval service and using an algorithm, a code which appears on the display unit of the device and that the user must key in at a keyboard of a terminal connected to the information retrieval service, while a code is also calculated by the information retrieval service, using a similar algorithm, and the code calculated by the information retrieval service is compared by the information retrieval service with the code keyed in by the user; if this comparison determines that there is a match between these two codes, the user will be given access to the information retrieval service, whereas, if there is no match between the two codes, such access will continue to be denied.

In addition to the microcomputer's own clock system, the device also includes a real-time clock which makes it possible to give the device a limited lifetime, to make it operate in accordance with a prescribed time schedule and/or date the operations, especially the uses and transactions carried out with this portable device.

The device includes a read-only memory (ROM) organized into two zones, namely:

a programming zone in which are stored the instructions relating to:

the decoding and optical-reception functions;

the identification function;

the authentication function;

the application functions, such as betting, television games, money transfer, home shopping, and a fabrication zone to memorize the data relating to the fabrication of the card and to initialize the product, said data relating to:

the client's code;

the number of the mask used for the microcomputer;

the fabrication key, which in particular consists of 128 bits, making it possible to control the personalization.

The storage memory of the device is also organized into two zones, namely:

a data zone for storing data concerning, for example, a bet, a game, an amount of money, the number of films viewed on the screen of a pay television set, transaction certificates, etc., and a personalization zone containing data relating to:

the confidential code (identification);

the operating parameters (e.g., cancellation of the card at the end of four unsuccessful attempts at identification);

the various secret keys that may be necessary for the application functions.

The storage memory may be a PROM or an EEPROM, as in memory cards or microprocessor cards, or a protected RAM.

The PROM or EEPROM solutions require relatively high input voltage and input current values. For security reasons, these memories cannot be programmed from outside, requiring self-programming by the microcomputer, as in the case of a microprocessor card. These solutions provide a satisfactory degree of security, but they are cumbersome. However, they are justified for certain applications.

Advantageously, a simpler and less expensive solution can be carried out via a RAM (random-access memory) inside the microcomputer protected by feeding the device with a very low current and whose access to the personalization zone via keyboard input can be protected in particular by a fuse which is blown after the personalization phase.

The microcomputer includes a data bus and an address but not accessible from outside, in such a way that the data in the device cannot be fraudulently read or altered from outside.

Preferably, the keyboard of the device is a numerical keyboard including twelve to sixteen keys, ten of which correspond to the digits 0 to 9 and two to six are additional function keys that may advantageously be personalized, depending on the application (betting, games, pay television). The display device is of the alphanumeric LCD type.

Apart from the arrangements described hereinabove, the invention consists of a number of other arrangements which will be discussed more fully hereinbelow with reference to a specific embodiment which will be described in conjunction with the accompanying drawings which do not imply a limitation.

DESCRIPTION OF THE DRAWINGS:

Finally.

DESCRIPTION OF THE PREFERRED EMBODIMENTS

Now, referring to the drawings, in particular FIGS. 1 through 4, a portable electronic device 1 is shown, of the memory-card type, including an external box 2 in the shape of a rectangular parallelepiped whose thickness e (FIG. 3) is small, particularly of the order of 5 mm. The width l and the length L of the box may be equal to those generally used for credit cards, bank cards, etc., that is to say, of the order of 54 mm for l and 85 mm for L.

Figure 11:
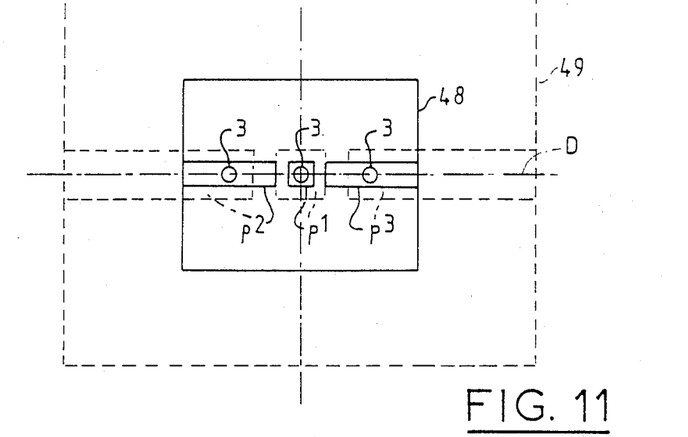
FIG. 11 is a block diagram showing why it is important to use a 3-phototransistor reading device for screens of different sizes.

The device includes at least some optical reception means R, preferably consisting of phototransistors 3 (FIG. 4) arranged on the edge of a small side of the box 2, and in particular arranged in a straight line. In the example considered, the phototransistors are three in number. FIG. 11 shows why it is important to have a reading device with at most three phototransistors 3 for screens 48, 49 of different sizes. Screen 48 corresponds to the smaller size, and screen 49 to the larger size.

When a change is made from one screen size to another, the spacing between the centers of the illuminated blocks p1, p2, p3 will change, while the spacing between the phototransistors 3 will remain constant.

With the arrangement using at most three phototransistors, the entire set of blocks is always centered, and it is possible to extend the right and left blocks p2, p3, following the direction of alignment D of the phototransistors in such a way as to be sure that, regardless of the size of the screen, the right and left phototransistors are always opposite a portion of the corresponding blocks p2, p3.

The screen of terminal is generally convex in shape. In order to facilitate the application of the edge of the box 2 provided with the phototransistors 3 against this screen, one can advantageously, at each end of the edge, provide a buffer Q (see FIG. 2), for example, one made of an elastomer material and substantially hemispherical in shape, projecting from this edge.

Figures 1, 2, 3, 4, 8:
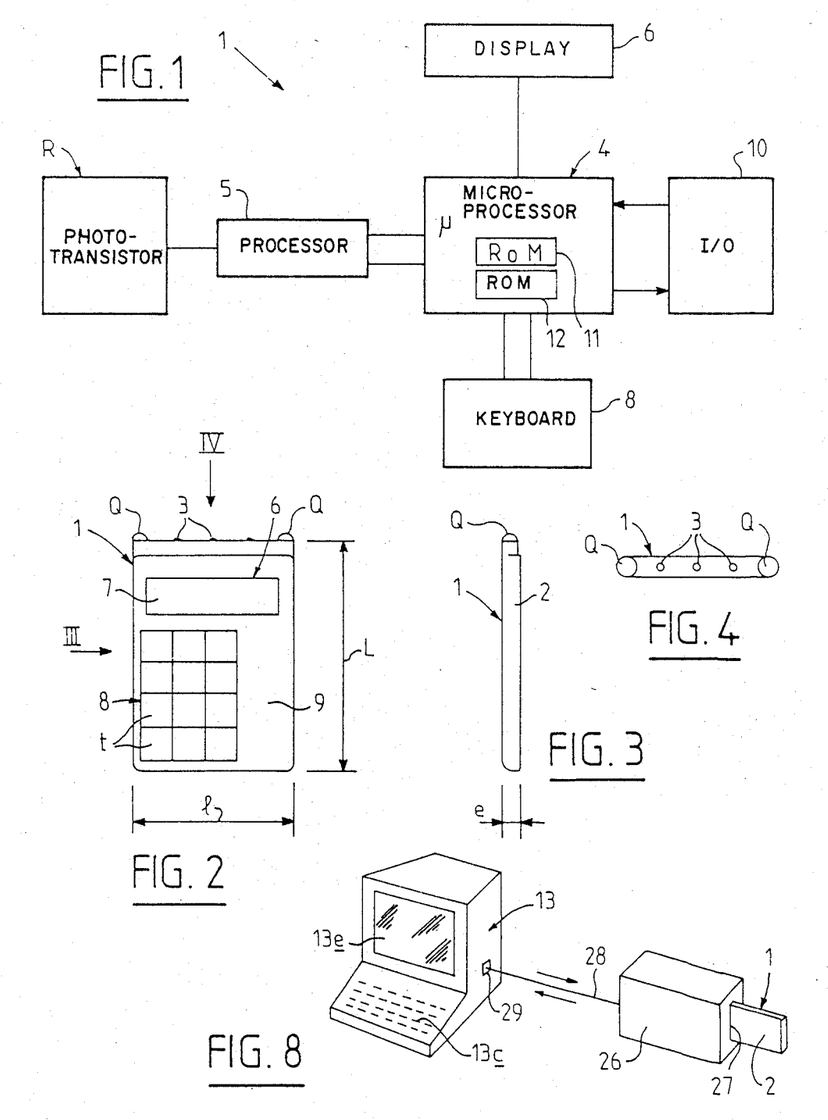
FIG. 1 of these drawings is a simplified block diagram of a portable electronic device embodying the invention.
FIG. 2 is a plan view of the device.
FIG. 3 is a view in the direction of arrow III in FIG. 2.
FIG. 4 is a view in the direction of arrow IV in FIG. 2.
FIG. 8 is a block diagram illustrating the use of a device of the invention together with an adapter box connected directly to a terminal.

The receiving means R, as illustrated in FIG. 1, are connected to a microcomputer 4 by means of processors 5 suitable for carrying out self-adaptation to a terminal screen 13e.

In fact, the transmission of data intended for the receiving means R is carried out by a sequence of bright and dark blocks p (see FIG. 8) which appear in a predetermined zone of the screen 13e of a terminal 13; depending on the variations in brightness from one terminal screen to another, it is possible that a dark block of one terminal would be brighter than a bright block of another terminal. In order to prevent distortion when reading from one terminal to the other, processors are provided in order to make it possible, during an initialization phase, to adjust a comparison threshold on the basis of the brightness of the terminal screen. In order to take account of the dispersion in sensitivity between the phototransistors, the comparison threshold may be defined for each of the phototransistors.

Figure 12:
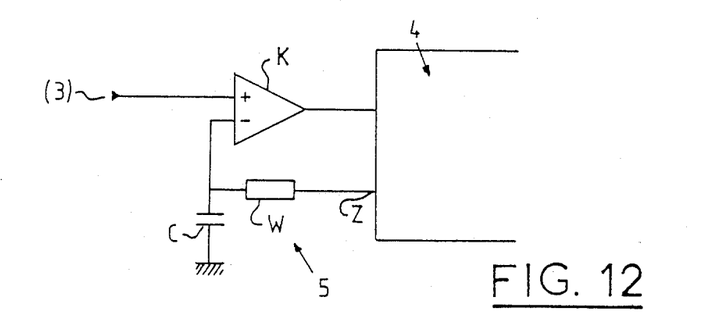
FIG. 12 is a block diagram of a circuit for self-adaptation to a screen.
Figure 13:
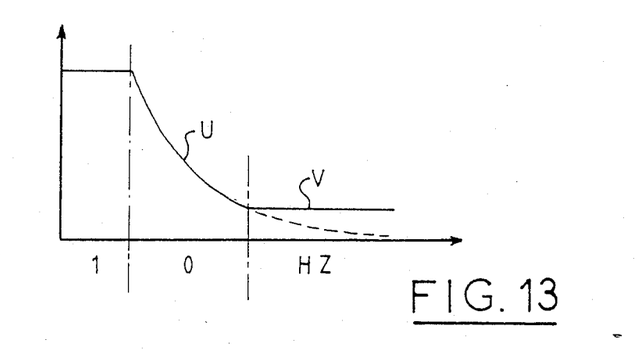
FIG. 13 is a block diagram illustrating the functioning of the circuit in FIG. 12.

As can be seen in FIG. 12, this threshold can be obtained by discharging a capacitor C, under the control of the microcomputer 4, through a resistor W. The charging and discharging of the capacitor C are controlled by the microcomputer 4 via the resistor W of an inlet/outlet port Z, which may be placed in one of the following states: a high state ("1") for charging the capacitor C, a low state ("0") for discharging the same, and a high-impedance state ("HZ") for maintaining the threshold during reception. A comparator K receives the signal from the phototransistors at one inlet (+), and the voltage across the terminals of the capacitor C, the comparison threshold, at another inlet (−). Before being put into operation, the capacitor C is charged to its maximum value. During initialization, the capacitor C discharges, as indicated by the arc of curve U in FIG. 13 (the voltage across the terminals of the capacitor as the ordinate, and time as the abscissa) until it reaches the desired value, which is a function of the reception level and is determined by the microcomputer. The comparison threshold is then kept constant, as indicated by the line segment V in FIG. 13, during reception. This comparison thus depends on the level of optical reception. This variable threshold may be supplemented by a fixed threshold for low brightness. The same effect may be obtained by controlling the gain of an amplifier via the microcomputer.

The coding of the optical transmission is defined such as to reduce the transmission time and to adapt to all the networks and protocols connecting the terminal to the central system. The main characteristic of this transmission within the framework of a data processing system are that it is possible only to control the sequencing of the blocks displayed, but not the display times. These characteristics justify the use of at least two phototransistors for transmission on a data processing screen. The characteristics of transmission by broadcast or cable television enable the user to control the display time, affording the possibility of a synchronous transmission by a single phototransistor. The synchronization of the transmission is carried out by means of video scanning. This enables the portable device, when used together with a television set, to function and to receive data from some distance away (several meters) by pointing the product at the screen.

The optical reception and decoding functions recorded in the memory of the microcomputer of the portable device may be specific to the mode of operation, data communications or television, but the same device will be capable of functioning on both support systems by using one or three phototransistors.

The device 1 includes a display device 6, preferably a liquid-crystal display device (LCD), forming a rectangular screen 7 (FIG. 2) on the box. Preferably, this screen 7 is equipped to display eight alphanumeric characters arranged in a straight line. The display device 6 can be used to view data coming from the microcomputer 4.

A source of electrical energy, generally consisting of an electric battery of small size (not shown in the drawings), is provided to feed the various circuits.

The device includes a keyboard 8, which may be set up as depicted in FIG. 2, consisting of twelve keys t each corresponding to the ten digits 0 to 9. The keys t are arranged in four rows of three each, parallel to the screen 7. The keyboard 8 is located next to one edge of the box 2 shown in the illustration in FIG. 2 as the left edge, so that a relatively large area 9 remains available at the right and can be used graphically.

The keyboard 8 enables the user to enter data into the microcomputer 4 as well.

Advantageously, the box 2 includes some serial input/output elements 10 connected to the microcomputer 4. These elements may consist of a plug connection or optical coupling device, and the optical input may advantageously be formed from one of the three phototransistors. Such a plug connection 10 can be used for direct connection to a socket provided in an adapter box 26, which will be discussed in conjunction with FIG. 8.

The microcomputer 4 is a masked microcomputer, in CMOS technology. It may be of the "Motorola" MC 68 HC 05B6 type, for a self-programmable microcomputer version or of the NEC 75308 type for a random-access-memory (RAM) version, or else of the specific-circuit type (ASIC) for a protected RAM version. The specific circuit will be developed from a standard microcomputer of one of the aforementioned types in which the memory-protecting devices will be included. These protective devices may consist of a fuse which is blown after writing into the memory. It includes a read-only memory (ROM) 11 and a random-access memory 12.

The read-only memory 11 is organized into two zones, namely, a programming zone and a fabrication zone, which will be discussed hereinbelow.

The memory 12 is also organized into two zones, namely, a data zone and a personalization zone, which will also be discussed hereinbelow.

The data bus and the address bus (not shown in the drawings) of the microcomputer 4 are not accessible from outside, so that the data stored in the device 1 cannot be fraudulently read or altered from outside.

The microcomputer 4 is programmed (the instructions for the program are stored in the read-only memory 11) so as to activate the device only after keying in on the keyboard 8 the confidential identification code (personal identification number PIN) of the user of the device. This confidential code is known only to the holder of the device 1.

Advantageously, a timing circuit may be provided to cause the microcomputer 4 to return to the quiescent state at the end of a predetermined length of time, say, four minutes, after this microcomputer has been activated by entering the correct confidential code. The quiescent state of the microcomputer 4 corresponds to a state in which this microcomputer disregards the data coming from the receiving means R.

Furthermore, the program stored in the memory 11 is set up such as to disable the device 1 after the consecutive input of a certain number of incorrect confidential codes on the keyboard 8, e.g., four codes. The device 1 then becomes unusable and can be reactivated only by a special procedure, for example, through an information retrieval service.

Since the device 1, in its basic applications, is designed to authorize connection to an information retrieval service, from a terminal 13 or its equivalent ("MINITEL" console), the microcomputer 4 is programmed (instructions stored in the programming zone of the memory 11) to ensure an authentication function with respect to the information retrieval service S. To do this, the microcomputer calculates, on the basis of data received from the information retrieval service, using an algorithm, a code which will appear on the display device 6. The user must then enter this code on the keyboard 13c of a terminal 13 (see FIGS. 7 and 9) connected to the information retrieval service. The calculation of a code is also carried out by the information retrieval service, following a similar algorithm, and a comparison of the code calculated by the information retrieval service and the code keyed in by the user is made by the information retrieval service; if the two codes are found to match, the user is given access to the information retrieval service, whereas, if there is no match between the two codes calculated, access to the information retrieval service continues to be denied to the user.

FIGS. 5 to 7 and FIG. 9 serve to illustrate these characteristics more clearly.

Figure 5:
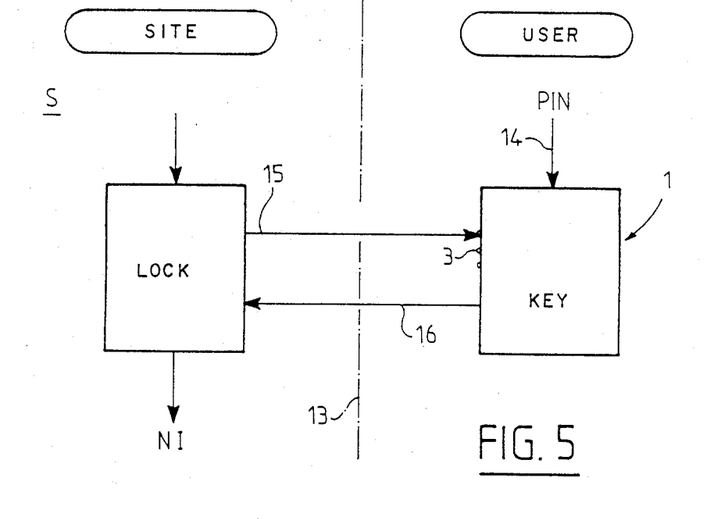
FIG. 5 is a block diagram illustrating the identification and authentication principles.

In FIG. 5, the information retrieval service or the site to be protected is shown schematically by S, on the left side of the figure. The dot-dash line 13 is the schematic representation of a terminal, constituting an interface, remote from the information retrieval service S and connected thereto, for example, by a cable. This terminal 13 includes a screen and a keyboard which are not shown in FIG. 5. The device 1 incorporating the invention is shown schematically on the right side of this FIG. 3. In order to gain access to the information retrieval service S from the terminal 13, the user must first key in his personal identification code PIN on the keyboard of the device 1, which is shown schematically by the arrow 14.

If the code is correct, the device 1 is ready to receive data, which can be indicated by a message on the screen 7 (FIG. 2).

The way in which these operations are carried out will be described more fully by reference to FIGS. 7 and 9. The schematic of FIG. 5 shows that, when the authentication is made, the device 1 behaves like a key, while the information retrieval service S behaves like a lock. The arrow 15 illustrates the fact that data coming from the information retrieval service are displayed on the screen of the terminal 13, while the arrow 16 illustrates the acquisition of data from the keyboard of the terminal 13.

Figure 6:
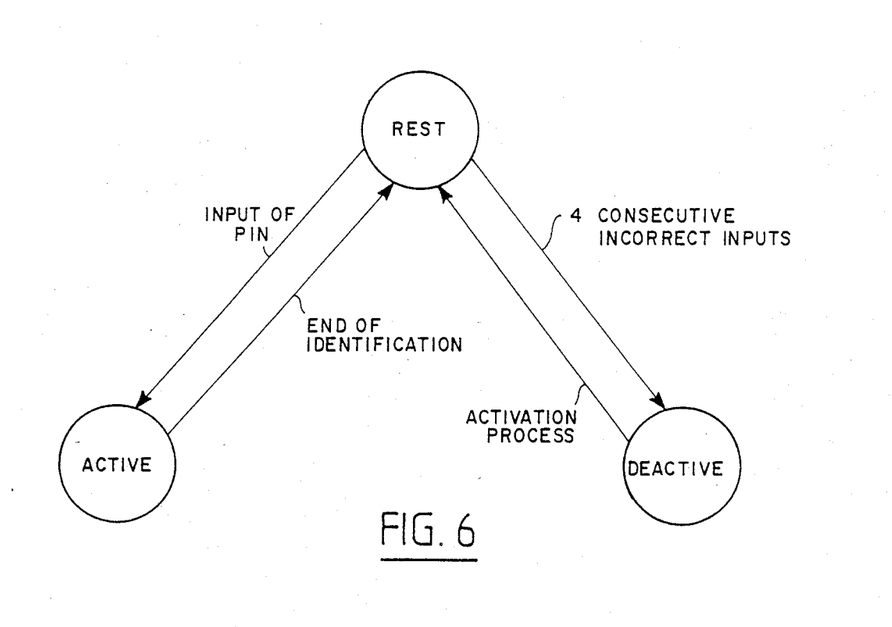
FIG. 6 is a block diagram illustrating the identification function alone.

The schematic in FIG. 6 illustrates the identification function.

Initially, the device 1 is in the quiescent state represented by the circle at the top of the schematic.

The input of the confidential code by the user, on the keyboard 8, brings the device into the activated state represented by the circle situated at the lower left of FIG. 6. In this state, the device is ready to receive and process the optical data appearing on the terminal so as to enable the user to gain access to an information retrieval service.

At the end of a period predetermined by a timing circuit, say, four minutes, which corresponds to the end of the identification function, the device 1 returns to the quiescent state.

If several incorrect confidential codes are entered one after the other, for example, four successive incorrect codes, the device 1 switches from the quiescent state to a deactivated state represented by a circle situated at the lower right of FIG. 6, rendering the device useless.

The device can be returned from the deactivated state to the quiescent state only by an "awakening" procedure that can be carried out only at an information retrieval service, in the example described herein.

Figure 7:
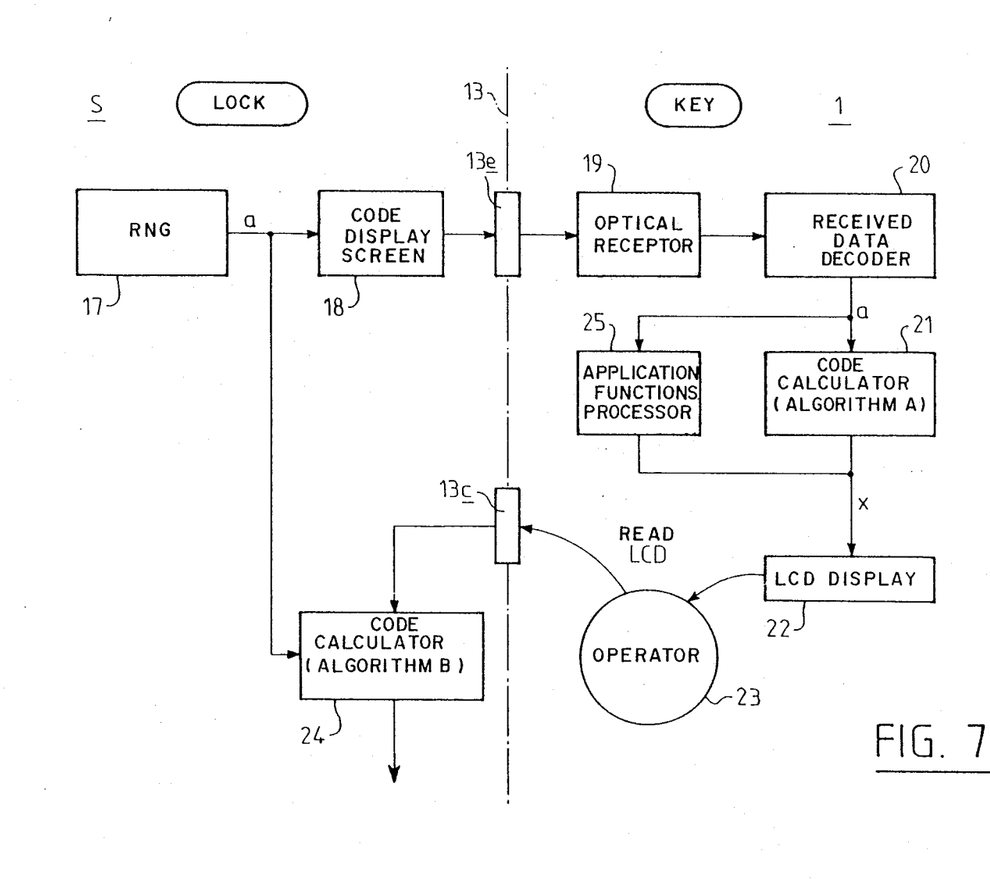
FIG. 7 is a block diagram illustrating the authentication function.

FIG. 7 is a schematic diagram illustrating the identification function mentioned in connection with the schematic in FIG. 5. The left side of this figure corresponds to the automatic communication system or lock of the information retrieval service S. The portion to the right of the dot-dash line (which schematically represents the terminal 13) corresponds to the key constituted by the device 1.

The block 17 corresponds to the generation of a random number a by the information retrieval service S. The block 18 corresponds to the coding and display on the screen 13e of the terminal. The block 19 corresponds to the optical reception by the phototransistors 3 of the device 1. The block 20 corresponds to the decoding, by the microcomputer 4, of the data received. The block 21 corresponds to the calculation of the alphabetic code by the microcomputer 4 on the basis of the received data a, using an algorithm A. The block 22 corresponds to the display, on the screen 7 of the device 1, of the result x corresponding to the code calculated at 21.

The user or operator, shown schematically by a circle 23, after reading the screen 7, keys in on the keyboard 13c of the terminal 13 the code displayed on the screen 7.

The block 24 corresponds, at the information retrieval service S, to the calculation of an identification code, using an algorithm B, on the basis of the random number a, and to the comparison of this calculated code, at the information retrieval service S, with the code keyed in by the operator 23 on the keyboard 13c.

If the comparison between the two codes shows a match, in accordance with the algorithms A and B, the operator 23 is given access to the system.

If there is no match, access continues to be denied.

The block 25, in relation to the device 1, concerns some of the application functions programmed into the microcomputer 4, such as television games, remote betting, pay television, money transfers, or home shopping.

Some operations require holding the box 1 against the screen 13e of the terminal for a relatively long time to carry out the exchange of data.

In order to obviate the need for the operator to hold the box 2, it is possible to provide an adapter box 26 (FIG. 8) for carrying out those functions which require a large amount of data exchange. This box includes a housing which terminates, on the outside, in an opening 27 into which the box 2 of the device can be inserted. The bottom of the housing 27 is provided with means supplementary to the devices 10 (FIG. 1). The box 26 is connected to a cable 28 whose other end may be plugged into a socket 29, for example, one of type RS 232 C, of the terminal 13 or into the peripheral socket of the "MINITEL."

Figure 9:
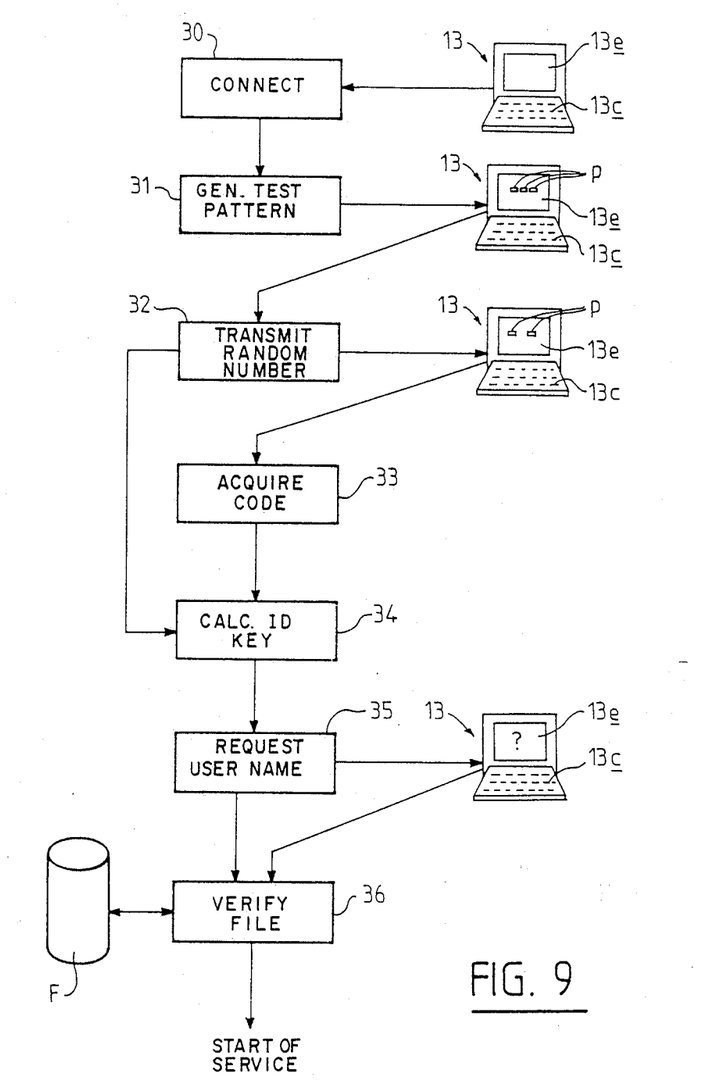
FIG. 9 is a block diagram illustrating the scenario for making a connection between a terminal and an information retrieval service by using the device of the invention.

FIG. 9 is a block diagram of the scenario for connecting a terminal 13 to an information retrieval service S, using the device 1 of the invention. This FIG. 9 makes clear the functions described in connection with FIG. 7.

The operator, from the terminal 13, first makes connection with the information retrieval service S by typing out a predetermined number on the keyboard 13c of the terminal 13. The block 30 corresponds to the establishment of the connection. The information retrieval service S generates a test pattern (block 31), that is to say, it makes illuminated blocks p appear on the screen 13e of the terminal; in the example considered, these blocks consist of three rectangles arranged in a straight line, as shown in FIG. 9.

The user then presents the device 1 in such a way that the phototransistors 3 are placed opposite the blocks p. The device 1 is now in place to receive data by optical means. Of course, the user first had to validate the device 1 by keying his confidential code on the keyboard 8 of the box 2, so that the user can be identified.

The user then depresses a key of the keyboard 13c of the terminal. The information retrieval service, in response to the depression of the key on the keyboard 13c, generates and transmits to the terminal 13, in coded form, a random number, as indicated by the block 32. The data corresponding to this random number are translated on the screen 13e into variations in the level of brightness of the blocks p, and the data are received by the device 1. The latter displays on the screen 7 an alphabetic or alphanumeric code which the user keys in on the keyboard 13c, which corresponds to the block 33 of acquisition by the information retrieval service S.

The block 34 corresponds to the calculation, by the information retrieval service S, of the code on the basis of the random number generated at 32 and to the comparison of this calculated code with the one supplied from the keyboard 13c.

When there is a match between these two codes, the information retrieval service S can complete the identification of the user before giving access to the service by requesting the user to give his name (block 35). The user then types his name on the keyboard 13c.

The last stage carried out by the information retrieval service, before giving access to service, is to verify in a file F, as indicated by the block 36, that the identification key agrees with the name and the access of rights. When this agreement is established, the user is connected to the service which he can use.

Figure 10:
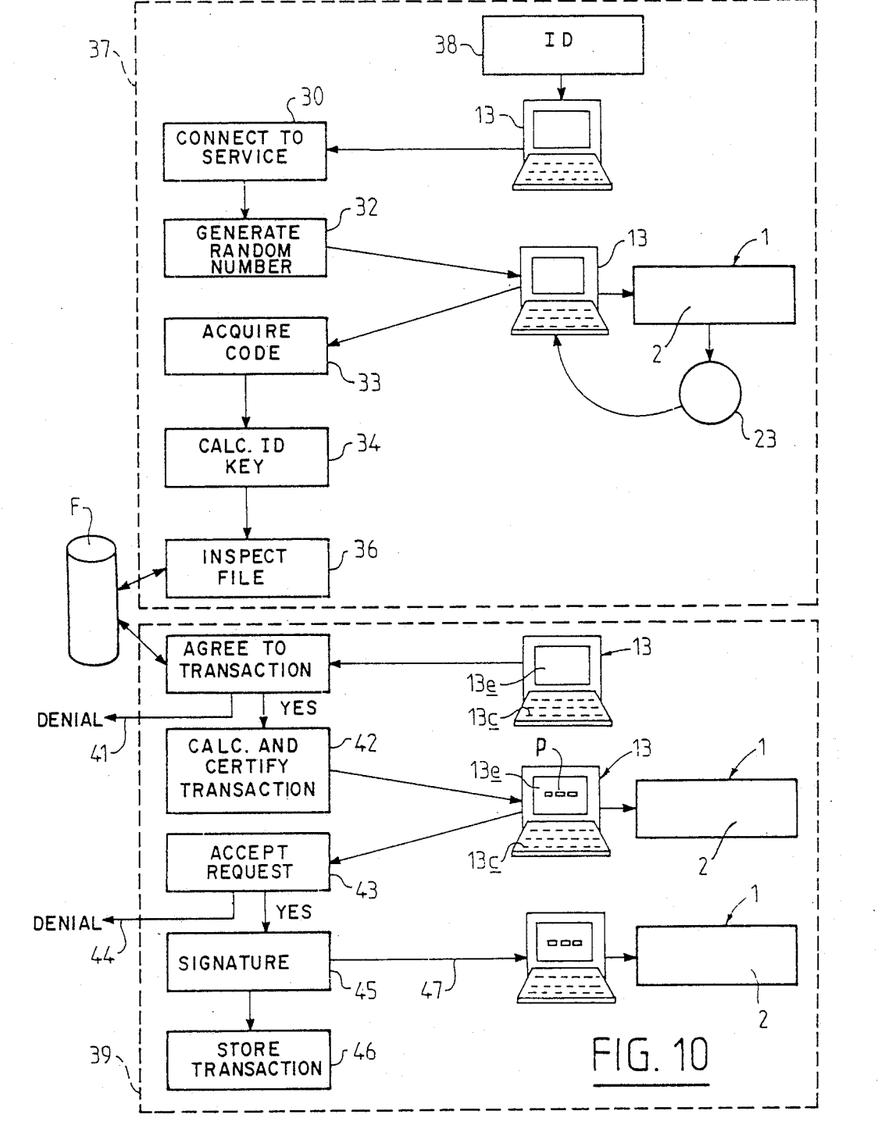
FIG. 10 is a block diagram similar to that in FIG. 9 for a money-transfer function.

FIG. 10 is a block diagram illustrating a money-transfer function which can be provided by the device 1 of the invention.

This function enables the user to insert a predetermined amount of money or a number of tokens into the device 1, to be more accurate into the storage memory 12 of this device, from an information retrieval service S, at which the holder of the device 1 has previously opened and built up an account. This function then enables him to gain access to services of the pay-television type, by suscription or upon consumption, or to bets or to other applications, by drawing on a sum of money which has been deposited in the storage memory 12 of the device 1.

The block diagram in FIG. 10 shows an example of how a money transfer functions can be set up.

The first stages of this program correspond to the preceding applications of the identification and authentication functions of the holder of the device 1 to the information retrieval service. These stages have been represented inside a rectangle 37 and correspond substantially to a simplified version of FIG. 9, where some intermediate stages have not been shown in the rectangle 37. The same references have been used in FIG. 10 to designate blocks similar to those in FIG. 9 without giving their description a second time. The block 38 corresponds to the identification of the user by the typing of the confidential PIN code on the keyboard 8 of the box 2.

The rectangle 39 comprises the stages of the program relating to the operations after the user, who is standing in front of the terminal 13 with the device 1, is given access to the money-transfer service.

The user, from the terminal 13, uses the keyboard 13c to make a request for charging, on device 1, a specified sum of money. Examination of this request is made in the block 40; the information retrieval service S interrogates its file F to ascertain whether the user has sufficient credit in the user's account to permit charging the sum requested. If the reply is negative, the request is denied, as shown schematically by the output 41.

If the reply is affirmative, the program of the information retrieval service S goes to stage 42 for calculating and certifying the transaction. The service center S transfers the appropriate data to the terminal 13, where these data appear in the form of illuminated blocks p, bright or dark, on the screen 13e. The device 1 is held against the screen 13e by the user, with its edge carrying the phototransistors 3 being placed in such a way as to collect the data stored in the blocks p.

The user or operator must then type on the keyboard 13c an instruction corresponding either to acceptance of the transaction certificate and of the sum announced by the information retrieval service S, or to rejection of the certificate; lack of reply on the part of the operator shall be regarded as a rejection.

The block 43 corresponds to that stage of the program of the information retrieval service S which follows the operator's reply. If this reply is negative, the transaction is rejected at 44. If the reply is positive, the information retrieval service's program goes to the next stage represented by the block 45 corresponding to the signature, that is to say, on the information retrieval service side the data relating to the transaction are stored as indicated by the block 46, while on the side of the device 1 the sum requested by the operator is actually stored in the storage memory 12 of the device 1 in accordance with the data transmitted by the information retrieval service, as shown schematically by the arrow 47.

It is also possible to make provision for the storage in the device 1 of the data relating to the transaction carried out (transaction certificate stored in the device 1).

Advantageously, this money-transfer application may be operated by means of the adapter box 26.

Conversely, from a device 1, in which a sum of money has been stored, it is possible to gain access to services, bets or games by deducting the sum to be paid stored in the storage memory 12.

In particular, this payment makes possible the local actuation of the application of the same or remote bet (gambling games, lotteries, sporting events, horse or other races, etc.), say, from a television set or from a "MINITEL".

The device 1 of the invention, in particular with its money-transfer function, is particularly well suited to pay TV.

The device may periodically be used to make remote payments for subscription to a pay-TV service and to receive from the information retrieval service, in exchange for this payment, a code for the subscription period which will enable this device 1 to control the descrambling of the image.

The device 1 of the invention enables the user, still within the context of a pay-TV arrangement, to pay for one broadcast only or for only one film which the user wishes to see on a specified date.

The device 1 of the invention can provide a listing of the films viewed, in particular for measuring the audience and for payment of copyright fees.

Within the context of a televised performance, it is possible to send data by broadcast or by cable networks through a television set by causing to appear on the television screen a test pattern intended to be read by the phototransistors of the device 1 of the invention. The device can be held flat against the screen or held at a distance with an appropriate coding. The data so transmitted can make it possible to select the winners of a television game or to set up games or bets directly on the television set. The user may, for example, bet a certain amount of money through his device by drawing on his funds with the money-transfer function and then point the device at the television set in order to receive the data, depending on the result. The holder of this device 1 can then have his winnings deposited into his account handled by an information retrieval service.

In conclusion, the applications of the device of the invention are manifold: remote betting (e.g., by means of a data-communication supporting device such as the ("MINITEL"), television games, pay television, home shopping, or television auctions. The supporting device may include data communication equipment, cable networks or broadcasting, while the terminal whose screen enables the user to use the device 1 may be a "MINITEL", a microcomputer connected or not connected, or a television console.

The device 1 can function independently on any type of screen without a special reader and without any alteration of the terminal.

We claim:

1. A portable electronic device comprising:
   at least some optical reception means;
   a microcomputer suitable for processing data received;
   a display device to display data emanating from the microcomputer;
   an electrical source to supply power to various circuits;
   a keyboard enabling a user also to key in data into the microcomputer, and said microcomputer is programmed to use the data from at least one of the optical reception means and the keyboard and to display results taking account of said data, possibly in combination; and
   processors to apply self-adaptability to a screen, said processors having a capacitor whose charging and discharging through a resistor are controlled by the microcomputer, said processors obtaining a comparison threshold based on a level of optical reception.

2. The portable electronic device as set forth in claim 1, wherein the microcomputer is programmed to activate only after keying in, on the keyboard of a confidential identification code of the user of the device.

3. The portable electronic device as set forth in claim 1 or 2, further including a protected storage memory organized into two zones, namely, a data zone and a personalization zone.

4. The portable electronic device as set forth in claim 3, wherein the protected storage memory is constructed as an RAM and access to the personalization zone, by keying in, is protected by a fuse which is blown after personalization.

5. The portable electronic device as set forth in claim 1 or 2, wherein a shape of the portable electronic device is of a rectangular parallelepipedal box with a small thickness, particularly on an order of 5 mm, the optical reception means consisting of phototransistors placed on an edge of a small side of the rectangular parallelepipedal box.

6. The portable electronic device as set forth in claim 5, wherein a maximum number of phototransistors is three, the phototransistors being in particular arranged in a straight line.

7. The portable electronic device as set forth in claim 5, wherein ends of a side of the rectangular parallelepipedal box, comprising the phototransistors, are provided with buffers, of an elastomer material, permitting better contact of the rectangular parallelepipedal box with a terminal screen.

8. The portable electronic device as set forth in claim 1, wherein the microcomputer is programmed to be disabled after the keying in, one after another, of a certain number of improper confidential codes, reactivation being assured only by a special procedure or by a special tool.

9. The portable electronic device as set forth in claim 1, further designed to allow communication with an information retrieval service via a terminal or equivalent, wherein the microcomputer is programmed to ensure, after an identification functions has been performed, an authentication function at the information retrieval service by calculating a code which appears on the display device of the portable electronic device using an algorithm and based upon data from the information retrieval service and the user must key in at a keyboard of the terminal connected to the information retrieval service, while a code is also calculated by the information retrieval service using a similar algorithm, and the code calculated by the information retrieval service is compared by the information retrieval service with the code keyed in by the user, wherein if this comparison determines that there is a match between the two codes, the user will be given access to the information retrieval service.

10. The portable electronic device as set forth in claim 1, further including, in addition to a clock system of the microcomputer, a real-time clock for limiting a lifetime of the portable electronic device, to make the portable electronic device work in accordance with at least one of time slices and date the operations, especially uses and transactions effected with said portable electronic device.

11. The portable electronic device as set forth in claim 1, wherein the keyboard is a numerical keyboard associated with function keys and the display device is of the alphanumeric type.

12. The portable electronic device as set forth in claim 1, further including inlet/output ports connected to the microcomputer to permit a serial inlet and outlet, and an adapter box is provided with a housing which is exhausted to the atmosphere through an opening in which a box of the portable electronic device can be engaged, a bottom of the housing being provided with means supplementary to the inlet/outlet ports, the adapter box being connected to one end of a cable whose other end can be plugged into a socket of a terminal.

13. The portable electron device as set forth in claim 1, wherein the microcomputer is programmed to ensure a money-transfer function.

14. The portable electronic device as set forth in claim 1, wherein the microcomputer is programmed and the keyboard is personalized to ensure a television function, with direct game type participation of the user with selection of population samples.

15. The portable electronic device as set forth in claim 1, being connected to at least one of a group of operations including at least one type of remote betting, home shopping, television auctions, television games, and access to pay television.

* * * * *

UNITED STATES PATENT AND TRADEMARK OFFICE
CERTIFICATE OF CORRECTION

PATENT NO. : 4,910,775
DATED : March 20, 1990
INVENTOR(S) : AUDEBERT et al

It is certified that error appears in the above-identified patent and that said Letters Patent is hereby corrected as shown below:

On the cover page, line 2, "Yves et al." should read --Audebert et al.--;

Item [75], "Audebert Yves, Croissy Sur Seine; Delahye Achille, Fontenay Sous Bois" should read --Yves Audebert, Croissy Sur Seine; Achille Delahye, Fontenay Sous Bois--.

Signed and Sealed this

Twentieth Day of August, 1991

Attest:

HARRY F. MANBECK, JR.

Attesting Officer

Commissioner of Patents and Trademarks